(12) United States Patent
Maihöfer

(10) Patent No.: US 12,230,077 B2
(45) Date of Patent: Feb. 18, 2025

(54) METHOD FOR GENERATING AN OPERATING TIME KEY PERFORMANCE INDICATOR, AND A MANAGEMENT SYSTEM

(71) Applicant: MERCEDES-BENZ GROUP AG, Stuttgart (DE)

(72) Inventor: Christian Maihöfer, Iggingen (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 192 days.

(21) Appl. No.: 17/917,603

(22) PCT Filed: Mar. 19, 2021

(86) PCT No.: PCT/EP2021/057053
§ 371 (c)(1),
(2) Date: Oct. 7, 2022

(87) PCT Pub. No.: WO2021/204515
PCT Pub. Date: Oct. 14, 2021

(65) Prior Publication Data
US 2023/0145315 A1 May 11, 2023

(30) Foreign Application Priority Data
Apr. 9, 2020 (DE) .................... 10 2020 110 076.0

(51) Int. Cl.
*G07C 5/08* (2006.01)
*G07C 5/00* (2006.01)
*G08G 1/00* (2006.01)

(52) U.S. Cl.
CPC .......... *G07C 5/0816* (2013.01); *G07C 5/008* (2013.01); *G07C 5/0841* (2013.01); *G08G 1/20* (2013.01)

(58) Field of Classification Search
CPC . G07C 5/008; G07C 5/02; G07C 5/08; G07C 5/0808; G07C 5/0816;
(Continued)

(56) References Cited

U.S. PATENT DOCUMENTS 10,794,747 B2 10/2020 Hofmann et al.
2004/0073468 A1* 4/2004 Vyas ................ G06Q 10/06315
705/7.38
(Continued)

FOREIGN PATENT DOCUMENTS

DE 10018942 A1 10/2001
DE 102009047330 A1 6/2011
(Continued)

OTHER PUBLICATIONS

Notice of Reasons for Refusal dated Oct. 3, 2023 in related/corresponding JP Application No. 2022-561594.
(Continued)

*Primary Examiner* — Joseph C Rodriguez
(74) *Attorney, Agent, or Firm* — PATENT PORTFOLIO BUILDERS PLLC

(57) ABSTRACT

An operating time key performance indicator is generated so as to display an operating time of a motor vehicle for a user of a management system by the management system. At least one operating parameter of the motor vehicle is transmitted to an electronic computing device of the management system. The electronic computing device id remote from the motor vehicle. The operating time key performance indicator is determined by the electronic computing device in accordance with the at least one transmitted operating parameter. Additionally, at least one load parameter of the motor vehicle is recorded and transmitted to the electronic computing device and the operating time key performance indicator is additionally generated by the electronic com-
(Continued)

puting device in accordance with the at least one load parameter.

9 Claims, 1 Drawing Sheet

(58) Field of Classification Search
CPC ........... G07C 5/0841; G06Q 10/06393; G06Q 10/083; G06Q 50/40; G08G 1/20
See application file for complete search history.

(56) References Cited

U.S. PATENT DOCUMENTS

| | | | |
|---|---|---|---|
| 2006/0047379 A1* | 3/2006 | Schullian | G06Q 20/20 701/19 |
| 2007/0241882 A1* | 10/2007 | Panttaja | G08G 1/20 340/521 |
| 2013/0141249 A1* | 6/2013 | Pearlman | H04Q 9/00 340/870.03 |
| 2015/0193994 A1* | 7/2015 | McQuade | G07C 5/008 701/29.3 |
| 2017/0103101 A1* | 4/2017 | Mason | G06F 16/2365 |
| 2019/0213684 A1* | 7/2019 | Sundar Singh | H04W 4/42 |
| 2019/0279440 A1 | 9/2019 | Ricci | |
| 2021/0012600 A1 | 1/2021 | Imai et al. | |
| 2023/0392942 A1* | 12/2023 | Fotak | G06Q 10/06 |

FOREIGN PATENT DOCUMENTS

| | | |
|---|---|---|
| DE | 102018126414 A1 | 4/2019 |
| JP | 2565612 Y2 | 3/1998 |
| JP | 2019021262 A | 2/2019 |
| KR | 102077758 B1 | 4/2020 |
| WO | 2013138798 A1 | 9/2013 |
| WO | 2019176104 A1 | 9/2019 |

OTHER PUBLICATIONS

International Search Report mailed Jun. 21, 2021 in related/corresponding International Application No. PCT/EP2021/057053.
Written Opinion mailed Jun. 21, 2021 in related/corresponding International Application No. PCT/EP2021/057053.
Office Action dated Dec. 19, 2024 in related/corresponding KR Application No. 10-2022-7034900.

* cited by examiner

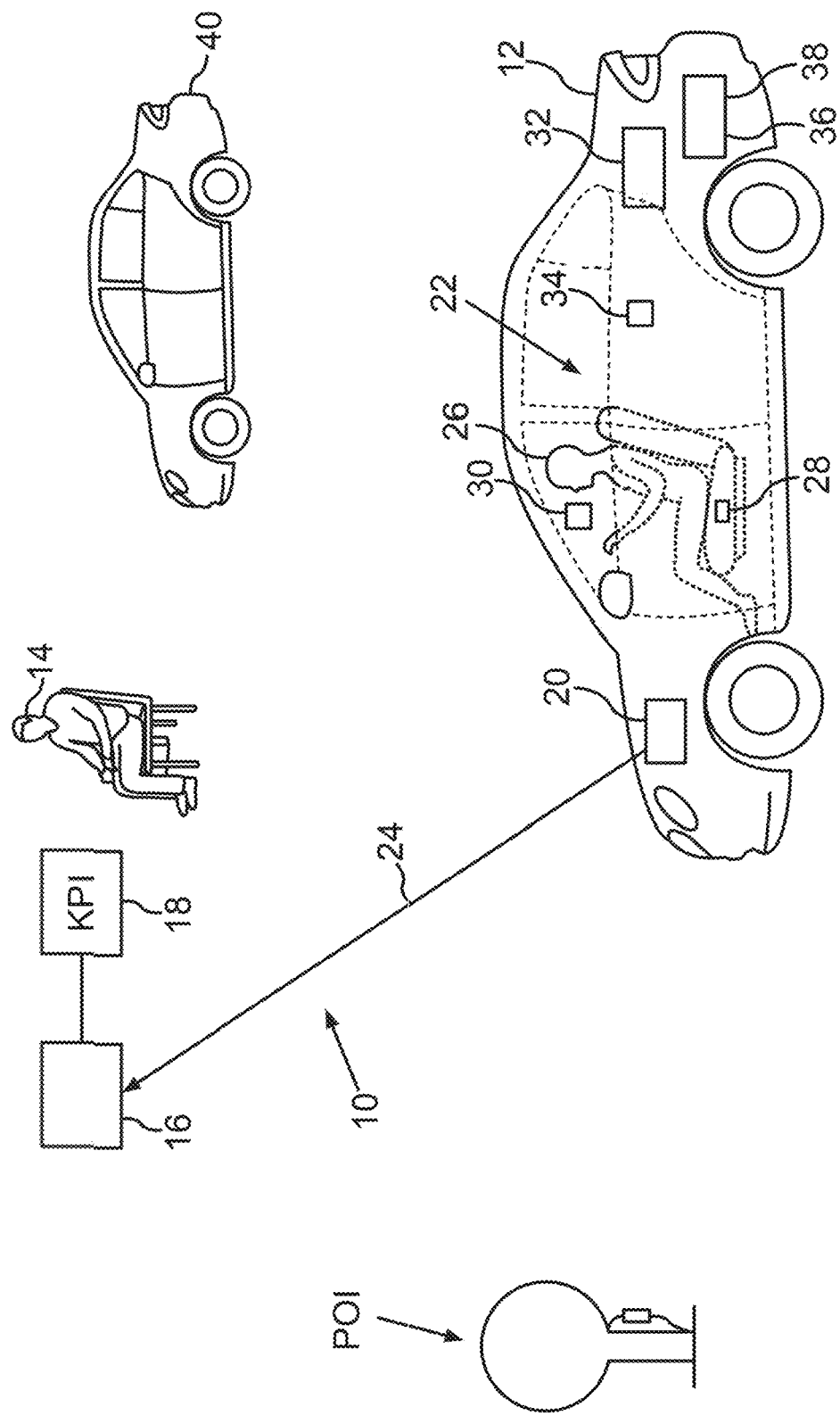

METHOD FOR GENERATING AN OPERATING TIME KEY PERFORMANCE INDICATOR, AND A MANAGEMENT SYSTEM

BACKGROUND AND SUMMARY OF THE INVENTION

Exemplary embodiments of the invention relate to a method for generating an operating time key performance indicator for displaying an operating time of a motor vehicle for a user by means of a management system, as well as to a management system.

According to the prior art it is already known that trips taken in a motor vehicle can be retrospectively analyzed and, from this, scenarios can be extrapolated, for example whether a motor vehicle was at a standstill in a traffic jam. Simple key indicators, which are also referred to as key performance indicators (KPI), are indispensable for efficient operational control of a fleet of vehicles. Instead of individually examining complicated scenarios, it is mostly more important in a fleet manager whether defined key figures lie within a defined range or are developing in the right direction.

WO 2013/138798 A1 discloses a method for evaluating driver behavior based on geodata, to improve the safety and efficiency of the driver. A method of a server device can comprise determining that a vehicle with telemetric data is communicatively coupled with the server device and comparing the telemetric data with objective driver data. It can then be determined whether there is a discrepancy between the telemetric data and the objective driver data. A performance evaluation can be generated by comparing the variation with a threshold and/or the objective driver data. The performance evaluation can be published together with other performance evaluations of other drivers in other vehicles, which are also communicatively coupled with the server device on a report dashboard module. Elements of game theory can be implemented in order to create a team driving challenge and/or a driving performance program, in order to generate the performance evaluation, in order to improve the safety and efficiency of the driver for commercial fleets.

DE 10 2018 126 414 A1 discloses a power-train control module of a vehicle, which provides a fuel pump actuator signal, which displays a fuel flow to a vehicle bus. A processor is configured to receive data from the vehicle bus. The processor integrates the actuator signals, to accumulate the fuel consumption of the vehicle, and periodically sends the accumulated fuel consumption, the vehicle speed, the engine rpm, the engine condition, and the vehicle location to a remote server. A subset of the accumulated fuel consumption is retrieved for a set of vehicles of a fleet, which drive a route during a timeframe, wherein the accumulated fuel consumption is compiled from fuel pump actuator signals. Fuel waste is calculated for determined periods of idle time in the accumulated fuel consumption. A financial loss due to the fuel waste is calculated. A report is created that contains the financial loss.

Exemplary embodiments of the present invention are directed to a method as well as a management system, by means of which a simplified identification of productive time periods of the motor vehicle can be realized.

One aspect of the invention relates to a method for generating an operating time key performance indicator for displaying an operating time of a motor vehicle for a user by means of a management system, in which at least one operating parameter of the motor vehicle is transmitted to an electronic computing device of the management system, the electronic computing device being remote from the motor vehicle, and in which the operating time key performance indicator is determined by means of the electronic computing device, depending on the at least one transmitted operating parameter.

It is provided that at least one load parameter of the motor vehicle is additionally recorded and is transmitted to the electronic computing device, and the operating time key performance indicator is additionally generated by means of the electronic computing device, as a function of the at least one load parameter.

The identification of productive time periods of the motor vehicle can thus be reliably and easily determined. In particular, the invention thus proposes that a key performance indicator (KPI) corresponding to the operating time key performance indicator is displayed for the management system of, for example, a fleet of vehicles, the key performance indicator identifying the productive operating time and, for example, distinguishing it from non-productive time.

In other words, it is provided that, for the motor vehicle or for several motor vehicles, which can then be referred to, for example, as a fleet, a simpler KPI is determined, which identifies productive operating times. A productive operating time can, for example, be when transporting a product or transporting a person. By contrast, non-productive operating times can, for example, be empty journeys, fuel trips, cleaning trips or workshop visits.

It is of course possible that a user of the management system, which can also be referred to as the fleet manager, can themselves specify whether a productive or non-productive operating time of the motor vehicle is occurring. If, for example, the outward journey can be billed to the customer in the case of a customer service vehicle, then this is productive operating time. If this cannot be done, for example in the case of a taxi, then there can be a scenario of an "empty outward journey," a non-productive operating time, for this sector or these customers.

It can also be left to the customer to carry out the classification for the following examples. For example, loading times of motor vehicles, unloading times of vehicles, stopovers for loading or unloading goods or people can be considered productive operating time or non-productive operating time depending on the user.

It is therefore proposed that the operating times of the motor vehicle are identified and are suitably displayed to the customer, for example a fleet manager. This can happen for a single motor vehicle but can also be carried out using averaging or summing up for a plurality of motor vehicles. The operating time key performance indicator can also be specified as an absolute value, for example "17 hours of productive operating time in this week" or as a relative value, for example "27% productive operating time."

In addition, someone, for example the fleet manager, can define and classify geographical areas, so-called geofences. In this context he can, for example, define a geofence marking a goods depot and allocate a stay of the motor vehicle within it as productive or non-productive operating time. In particular, a simple scalar value is thereby produced, which identifies the productive operating time or the relationship of the productive operating time to non-productive operating time, and displays this suitably for the fleet manager.

It can preferably be further provided that the operating time key performance indicator is observed or saved over different periods of time and, in this way enables, for example, a comparison. For example, a time period of 30% this week can be displayed as 27% the previous week or 30% this month, 27% this month or 25% this year as the time period with the operating time key performance indicator.

For example, it can moreover be provided that the management system has a display, which then in turn displays the operating time key performance indicator for the user, in particular the fleet manager.

According to one advantageous embodiment, a current location of the motor vehicle and/or a current speed of the motor vehicle are transmitted to the electronic computing device as operating parameters. In particular it is thereby made possible to determine, for example based on the operating parameters, whether the motor vehicle is driving, at a standstill, or parked. In this way it is made possible that it can be reliably checked whether the motor vehicle is currently experiencing productive or non-productive operating time. In this way, the operating time key performance indicator can be reliably generated.

It is also advantageous if a presence of at least one occupant of the motor vehicle is specified as a load parameter. In particular, a plurality of occupants in the motor vehicle can also be specified. For example, in the case of a taxi it can in this way be determined whether the taxi has occupants and thus whether it is experiencing productive operating time or non-productive operating time. It is thus made possible that the operating time key performance indicator can be reliably generated.

It is furthermore advantageous if the presence of the at least one occupant is determined by means of a pressure sensor of the motor vehicle and/or by means of a seatbelt sensor of the motor vehicle. In particular the pressure sensor can, for example, be integrated into a vehicle seat and thereby automatically determine the presence of the occupant, if the occupant sits on the vehicle seat. Moreover, the presence of the occupant can be reliably and automatically determined, based on the seatbelt sensor. There are also further possibilities included to record the occupants or the load parameters. For example, the presence of the occupants in the motor vehicle can also be determined by means of a camera. The operating time key performance indicator can thereby be determined in a simple way.

According to a further advantageous embodiment, a load of a loading space of the motor vehicle is specified as a load parameter. In particular, a load capacity or, more specifically, luggage, for example in the luggage space as loading space, can thus be specified as a load in the present case. It is thereby made possible to differentiate a productive operating time and a non-productive operating time on the basis of the load. In this way, the operating time key performance indicator can be reliably determined.

In a further advantageous embodiment, the load in the loading space is determined by means of an optical detecting device of the motor vehicle and/or by means of an electromagnetic chip system. For example, the optical detecting device can be formed as a scanner, whereby the load and the load parameter can then in turn be determined based on the scanning, for example by means of a barcode on the load. Moreover, the load in the loading space can be reliably recorded, for example by means of an electromagnetic chip system, for example by means of an NFC system (Near Field Communication). In this way, a reliable determination of the operating time key performance indicator is made possible.

It has also been proven to be advantageous if a fuel level of a fuel tank of a motor vehicle and/or a charge level of an electrical energy store of the motor vehicle are additionally transmitted to the electronic computing device and the operating time key performance indicator is determined in accordance with this. In particular, the refueling of the motor vehicle can thereby be detected, in that the fuel level is monitored. In particular, refueling the vehicle should, for example, be counted as non-productive operating time. By means of this additional evaluation of the fuel level, the operating time key performance indicator can thus be reliably determined.

It is also advantageous if a current location of the vehicle is compared with places of interest using an area map, by means of the electronic computing device, and the operating time key performance indicator is determined in accordance with the comparison. For example, the location of the motor vehicle can be compared with a database of known places of interest, which, for example, correspond to petrol stations, car washes, or workshops. From this, the electronic computing device can then in turn deduce whether this is a productive or non-productive operating time. Depending on this, the operating time key performance indicator can then in turn be reliably determined for the user.

In a further advantageous embodiment, a plurality of operating time key performance indicators for a plurality of motor vehicles is determined by means of the management system and, depending on the plurality of operating time key performance indicators, a fleet key performance indicator is generated by means of the electronic computing device. In particular, it is made possible through this that a common operating time key performance indicator for a whole fleet, which corresponds to the fleet key performance indicator, can be generated. This means that a fleet manager can get an overview of the extent to which his fleet is productive or non-productive. In this way, a simple overview can be generated for the user, which allows him a reliable assessment of the operating times for a plurality of motor vehicles.

A further aspect of the invention relates to a management system for generating an operating time key performance indicator for displaying an operating time of a motor vehicle for a user with at least one electronic computing device, wherein the management system is designed to carry out a method according to the preceding aspect. In particular, the method is carried out by means of the management system.

Advantageous embodiments of the method should be seen as advantageous embodiments of the management system. The management system has objective features for this, which enable an execution of the method and an advantageous embodiment thereof.

Further advantages, features and details of the invention arise from the following description of a preferred exemplary embodiment as well as based on the drawing. The preceding features mentioned in the description and combinations of features, as well as the features and combinations of features mentioned below in the FIGURE description and/or shown only in the single FIGURE are not only usable in the combinations indicated in each case, but can also be used in other combinations or in isolation, without departing from the scope of the invention.

BRIEF DESCRIPTION OF THE SOLE FIGURE

The sole FIGURE shows a schematic side view of an embodiment of a management system.

In the FIGURE, identical or functionally identical elements are provided with the same reference numerals.

DETAILED DESCRIPTION

The sole FIGURE shows an embodiment of a management system 10 in a schematic side view. The management system 10 is designed for generating an operating time key performance indicator KPI for displaying an operating time of a motor vehicle 12 for a user 14 of the management system 10 with at least one electronic computing device 16. Furthermore, the management system 10 herein has, in particular, a display 18, on which the operating time key performance indicator KPI can be displayed for the user 14. The user 14 can also be referred to as the fleet manager.

In a method for generating the operating time key performance indicator KPI, at least one operating parameter 20 of the motor vehicle 12 is transmitted to the electronic computing device 16 of the management system 10, the electronic computing device being remote from the motor vehicle, to display an operating time of the motor vehicle 12 for the user 14 by means of the management system 10, and the operating time key performance indicator KPI is determined depending on the at least one transmitted operating parameter 20 by means of the electronic computing device 16.

It is provided that, additionally, at least one load parameter 22 of the motor vehicle 12 is recorded and transmitted to the electronic computing device 16 and that the operating time key performance indicator KPI is additionally generated in accordance with the at least one load parameter 22 by means of the electronic computing device 16.

It can, in particular, be provided that a current location of the motor vehicle 12 and/or a current speed of the motor vehicle 12 are transmitted to the electronic computing device 16 as operating parameters 20. For example, the operating parameters 20 and/or the load parameter 22 can be transmitted by means of a mobile network 24 to the electronic computing device 16 that is remote from the vehicle.

It can furthermore be provided that a presence of at least one occupant 26 of the motor vehicle 12 is specified as a load parameter 22. To this end it can, for example, be provided that the presence of the at least one occupant 26 is determined by means of a pressure sensor 28 and/or by means of a seatbelt sensor 30 of the motor vehicle 12. It can be further provided that a load 32 of a loading space of the motor vehicle 12, for example a luggage space of the motor vehicle 12, is specified as a load parameter 22. To this end it can, for example, be provided that the load 32 in the loading space is determined by means of an optical detecting device 34 of the motor vehicle 12 and/or by means of an electromagnetic chip system, for example an NFC system.

It can furthermore, for example, be provided that a fuel level of a fuel tank 36 of the motor vehicle 12 and/or a charge level of an electrical energy store 38 of the motor vehicle 12 are additionally transmitted to the electronic computing device 16 and the operating time key performance indicator KPI is determined in accordance with this. It can furthermore be provided that a current location of the motor vehicle 12 is compared with an area map having places of interest POI by means of the electronic computing device 16 and the operating time key performance indicator KPI is determined in accordance with the comparison.

Furthermore, the FIGURE shows a further motor vehicle 40, wherein it is shown that a plurality of operating time key performance indicators KPI for a plurality of motor vehicles 12, 40 can be determined by means of the management system 10, and a fleet key performance indicator is generated in accordance with the plurality of operating time key performance indicators KPI by means of the electronic computing device 16.

The FIGURE therefore shows that a so-called key performance indicator (KPI) and thus the operating time key performance indicator KPI is displayed for the management system 10, for example of a fleet of vehicles, which herein then corresponds to a plurality of motor vehicles 12, 40, the operating time key performance indicator identifying the productive operating time and distinguishing it from non-productive operating time. Simple key performance indicators are, in particular, indispensable for efficient operational management of a fleet of vehicles. Instead of individually examining complicated scenarios, it is mostly more important to a fleet manager, which here corresponds to the user 14, whether defined key figures lie in a defined range or are developing in the right direction. To this end the FIGURE shows that a simple operating time key performance indicator KPI is determined for the fleet and identifies productive operating time periods. A productive operating time can be, for example, transporting a product, for example the load 32, or transporting an occupant 26. In contrast, non-productive operating times can be, for example, empty journeys, fuel trips, cleaning trips, or workshop visits. It is of course possible that the user 14 determines themselves whether a productive or non-productive operating time is occurring.

If, for example, the outward journey can be billed to the customer in the case of a customer service vehicle, then this is productive operating time. If this cannot be done, for example in the case of a taxi, then there is the scenario of an "empty outward journey," a non-productive operating time, for this sector or these customers. It can also be left to the user 14 whether a classification for non-productive operating time or productive operating time is carried out, for example loading times of motor vehicles 12, 40, unloading times for motor vehicles 12, 40, stopovers for loading or unloading goods or people.

Furthermore, the FIGURE shows that these operating times can be determined and can be shown to the user 14, in particular on the display 18. This can be done for the motor vehicle 12, but also for a plurality, wherein plurality currently in particular means more than one of motor vehicles 12, 40, and thereby a whole fleet of motor vehicles 40. This can also be formulated as an absolute value, for example "17 hours of productive operating time in this week" or as a relative value, for example "27% productive operating time".

In particular the operating parameters 20, such as location and speed of the motor vehicle 12, are to this end, transmitted to the electronic computing device 16. From this, scenarios such as "driving," "at a standstill" or "parked" can, for example, then be deduced. The motor vehicle 12 determines whether an occupant 26 is in the motor vehicle 12, for example by means of the pressure sensor 28, as is also used for the obligation to wear a seatbelt. The motor vehicle 12 determines the load 32 via suitable sensors, for example via a scanner or via the NFC technology. In a similar way, refueling operations can also be detected, as the fuel level is monitored. It is also possible that the vehicle location is compared with a database of places of interest POI, wherein these correspond, for example, to a petrol station, a car wash, or a workshop. From this the electronic computing device 16 can then deduce, in particular by means of an algorithm, whether a productive or non-productive operating time is occurring.

An addition to this can be that geographical areas, so-called geofences, can be defined and classified by the user 14. The user 14 can thus, for example, define a geofence marking a goods depot and allocate a stay of the motor vehicle 12 as a productive or non-productive operating time.

Ultimately a simple scalar value, the operating time key performance indicator KPI, is determined from this, which identifies the productive operating time or the relationship of the productive operating time to non-productive operating time, and displays this suitably to the user 14. It can in particular be advantageous if it takes place over different periods of time, and a comparison is thus enabled. For example, the operating time key performance indicator KPI can specify that operating times for the motor vehicle 12 or for the further motor vehicle 40 are to be recorded as 30% this week, 27% the previous week or 30% this week, 27% this month and 25 this year.

In general, the invention shows a method for identifying and displaying productive operating times in fleet management.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for generating an operating time key performance indicator for displaying an operating time of a motor vehicle for a user of a management system, the method comprising:
   receiving, by an electronic computing device of the management system, at least one operating parameter of the motor vehicle, wherein the electronic computing device is remote from the motor vehicle, wherein the operating time of the motor vehicle includes productive operating time and non-productive operating time;
   receiving, by the electronic computing device, at least one load parameter of the motor vehicle, wherein the at least one load parameter is at least whether there is a load in a loading space of the motor vehicle, wherein when there is a load in the loading space of the motor vehicle the at least one load parameter is indicative of productive operating time and when there is not a load in the loading space of the motor vehicle the at least one parameter is indicative of non-productive operating time;
   determining, by the electronic computing device, the operating time key performance indicator based on whether the received at least one operating parameter is indicative of productive operating time or non-productive operation time and whether the received at least one load parameter is indicative of productive or non-productive operating time, wherein the determined operating time key performance indicator indicates an amount of the operating time that is the productive operating time; and
   displaying, by the electronic computing device, the determined operating time key performance indicator.

2. The method of claim 1, wherein a current location of the motor vehicle or a current speed of the motor vehicle is received by the electronic computing device as the at least one operating parameter.

3. The method of claim 1, wherein the at least one load parameter includes a presence of at least one occupant of the motor vehicle.

4. The method of claim 3, wherein the presence of the at least one occupant is determined using a pressure sensor of the motor vehicle or using a seatbelt sensor of the motor vehicle.

5. The method of claim 1, wherein the load in the loading space is determined using an optical detecting device of the motor vehicle or using an electromagnetic chip system.

6. The method of claim 1, further comprising:
   receiving, by the electronic computing device, a fuel level of a fuel tank of the motor vehicle or a charge level of an electrical energy store of the motor vehicle, wherein the determination of the operating time key performance indicator is also based on the received fuel level or the received charge level.

7. The method of claim 1, further comprising:
   comparing, by the electronic computing device, a current location of the motor vehicle with an area map having places of interest, wherein the determination of the operating time key performance indicator is also based on the comparison.

8. The method of claim 1, wherein the electronic computing device determines a plurality of operating time key performance indicators for a plurality of motor vehicles, and wherein the electronic computing device generates a fleet key performance indicator based on the plurality of operating time key performance indicators.

9. A management system for generating an operating time key performance indicator for displaying an operating time of a motor vehicle for a user of the management system, the management system comprising an electronic computing device configured to:
   receive at least one operating parameter of the motor vehicle, wherein the electronic computing device is remote from the motor vehicle, wherein the operating time of the motor vehicle includes productive operating time and non-productive operating time;
   receive at least one load parameter of the motor vehicle, wherein the at least one load parameter is at least whether there is a load in a loading space of the motor vehicle, wherein when there is a load in the loading space of the motor vehicle the at least one load parameter is indicative of productive operating time and when there is not a load in the loading space of the motor vehicle the at least one parameter is indicative of non-productive operating time;
   determine the operating time key performance indicator based on whether the received at least one operating parameter is indicative of productive operating time or non-productive operation time and whether the received at least one load parameter is indicative of productive operating time or non-productive operation time; and
   display the determined operating time key performance indicator.

* * * * *